United States Patent [19]

McInerney

[11] Patent Number: 4,613,288

[45] Date of Patent: Sep. 23, 1986

[54] TURBOCHARGER

[75] Inventor: Charles E. McInerney, Rolling Hills Estates, Calif.

[73] Assignee: The Garrett Corporation, Los Angeles, Calif.

[21] Appl. No.: 498,228

[22] Filed: May 26, 1983

[51] Int. Cl.[4] .................. F04B 17/00; F16C 33/10
[52] U.S. Cl. ............................ 417/407; 384/107; 384/287; 384/901
[58] Field of Search .............. 417/407; 123/559; 415/110, 111; 308/DIG. 4, DIG. 15; 384/99, 100, 286, 287, 398, 901, 107

[56] References Cited

U.S. PATENT DOCUMENTS

| | | |
|---|---|---|
| 2,953,416 | 9/1960 | Collins . |
| 3,054,554 | 9/1962 | Buchi .................. 417/407 |
| 3,390,926 | 7/1968 | Woollenweber .......... 384/287 |
| 3,969,804 | 7/1976 | MacInnes .............. 417/407 |
| 4,128,283 | 12/1978 | Palmer ................ 417/407 |
| 4,171,137 | 10/1979 | Aizu .................. 415/111 |
| 4,171,936 | 10/1979 | Hageman .............. 417/407 |
| 4,209,207 | 6/1980 | Schippers . |
| 4,427,309 | 1/1984 | Blake ................. 417/407 |
| 4,560,325 | 12/1985 | Yoshioka ............. 384/901 |

FOREIGN PATENT DOCUMENTS

1300622 6/1962 France .
1428733 3/1976 United Kingdom .

*Primary Examiner*—Douglas Hart
*Attorney, Agent, or Firm*—J. Henry Muetterties; Albert J. Miller; James W. McFarland

[57] ABSTRACT

A lightweight, compact turbocharger for small internal combustion engines having a reduced number of component parts for simplified construction, an improved bearing structure and a novel means of transmitting control pressure to the actuator.

61 Claims, 10 Drawing Figures

TURBOCHARGER

BACKGROUND OF THE INVENTION

This invention relates generally to an improved turbocharger design. Turbochargers in general are well known in the art for supplying relatively high pressure air, commonly referred to as charge air, to the intake manifold of an internal combustion engine, such as a reciprocating piston engine of the type commonly used to power automobiles, trucks, buses and the like. Typically, the turbocharger comprises a turbine housing connected for receiving exhaust gases expelled from the engine and configured for guiding those exhaust gases into driving communication with a rotating turbine wheel. The turbine wheel is carried by a rotatable shaft connected to a compressor impeller within a compressor housing. The turbine wheel thus rotatable drives the compressor impeller which in turn draws ambient air into the compressor housing for compression and discharge in the form of charge air supplied to the intake manifold of the engine.

Typically the rotating shaft in a turbocharger is capable of being driven at relatively high rotational speeds, such as on the order of about 120,000 rpm or more. Thus, the shaft connecting the turbine wheel and compressor impeller must be supported by suitable journal bearings and thrust bearings within a center housing connected between the turbine housing and the compressor housing. Normally, lubricating oil from the engine is commonly pumped under pressure to the turbocharger center housing for lubricating the shaft bearing so as to prevent excessive bearing heating and wear.

Turbocharged engines are highly advantageous when compared with conventional naturally aspirated engines in that substantially denser air can be delivered to the combustion chamber or cylinders of the engine. This increased air density or mass permits the engine to be operated at substantially increased levels of performance and power output, and frequently with greater efficiency. In this regard, however, it is necessary to control the operation of the turbocharger so that the charge air is supplied to the engine only on demand at a pressure level not exceeding a predetermined design limit. While a variety of control schemes are known, it is conventional to provide a passage for bypassing exhaust gases around the turbine wheel and including a so called wastegate valve for opening and closing this bypass passage.

As turbochargers find increasing use on smaller and smaller automobile engines, it is necessary that they be lighter, more compact, and less costly to build. Simply scaling down a conventional turbocharger has not proven to be an effective, cost efficient way of producing these smaller turbochargers.

SUMMARY OF THE INVENTION

The present invention is directed to a unique, low cost, lightweight and compact turbocharger. While certain of the features of a conventional turbocharger have, of necessity, been retained, this small turbocharger represents a number of radical departures from conventional practice. The number of component parts has been minimized so as to significantly reduce overall manufacturing and material cost. The construction has likewise been totally simplified towards this same end.

The bolted turbocharger structure utilizes an open housing turbine volute closed by a wheel shroud and an open housing compressor volute closed by a thrust/diffuser plate, disposed at opposite ends of a finned center housing having generally the same outer dimensions. An annular ring at the compressor end of the turbocharger, part of the bolted assemblage, includes internal passages to transmit control pressure to the turbocharger actuator.

The invention also contemplates improved bearing structure and method for supporting the shaft which utilizes a minimum number of components, many of which perform multiple functions, and arranged and configured for simple, rapid assemblage. More particularly, a full floating journal bearing of relatively soft material is supported to the housing through a cast iron bearing carrier. Further, the journal bearing operates in conjunction with associated thrust plates or washers for generating one or more thrust bearings to support the shaft adjacent axial loads. The thrust/diffuser plate may be utilized to provide axial securement for the bearing assembly, and is also configured and arranged to inhibit oil migration from the bearing area to the compressor section.

Various other objects and advantages of the present invention are specifically set forth in or will become apparent from the following detailed description of a preferred embodiment of the invention when read in conjunction with the accompanying drawings.

DETAILED DESCRIPTION OF THE PREFERRED EMBODIMENTS

A turbocharged engine system 10 is shown in FIG. 1–4, and generally comprises a combustion engine 12, such as a gasoline or diesel powered internal combustion engine having a plurality of combustion cylinders (not shown), for rotatably driving an engine crankshaft 14. The engine 12 includes an air intake conduit or manifold 16 through which air is supplied by means of a compressor 18 of the turbocharger 20. In operation, the compressor 18 draws in ambient air through an air inlet 22 in a compressor housing 19 and compresses the air with a rotatable compressor impeller wheel 96 to form so called charge air for supply to the engine for combustion purposes.

Figures 1, 2, 3:
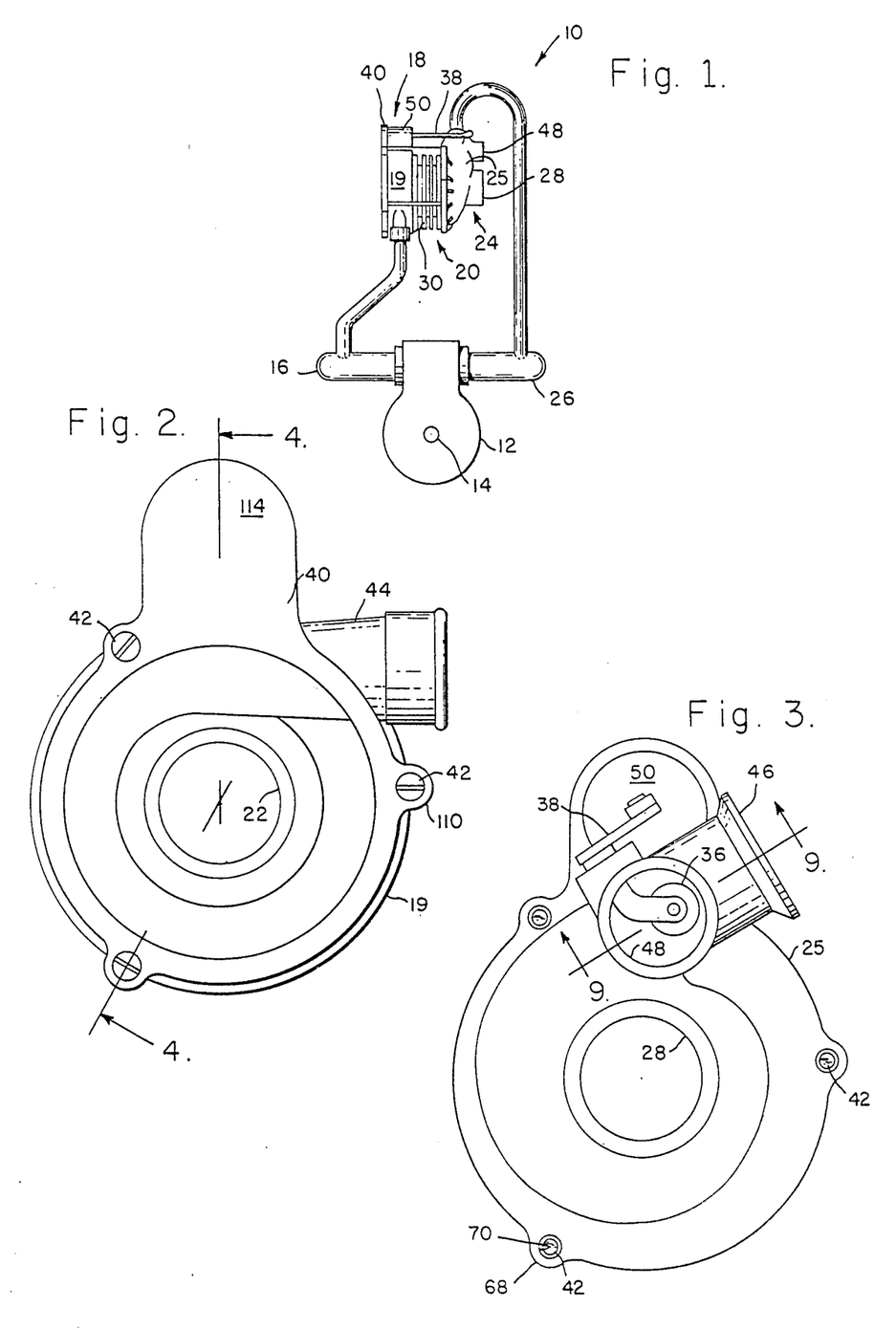
FIG. 1 is a schematic illustration of the turbocharger of the present invention shown operably coupled to an internal combustion engine.
FIG. 2 is a compressor end view of the turbocharger of the present invention.
FIG. 3 is a turbine end view of the turbocharger of the present invention.

Exhaust products are discharged from the engine through an exhaust conduit or manifold 26 for supply to a turbine 24 of the turbocharger 20. The discharge exhaust gases rotatably drive a turbine wheel 64 within the turbine housing 25 of turbine 24 at a relatively high rotational speed to correspondingly drive the compressor wheel within the compressor housing 19. In this regard, the turbine and the compressor wheels are carried for simultaneous rotation on a common shaft 78 supported within a center housing 30. After driving communication with the turbine wheel, the exhaust gases are discharged from the turbocharger 20 to an exhaust conduit 28 which may conveniently include pollution or noise abatement equipment as desired.

Circumferentially disposed around the outer end of the compressor housing 19 is a ring 40 through which a plurality of bolts 42 extend through to the turbine housing 25 to hold the assemblage of the turbine housing 25, center housing 30, and compressor housing 19 together. However, it should be noted that the compressor housing 19 is not fixed in relation to either the ring 40 or the turbine housing 25. Prior to tightening of the bolts 42, the compressor housing 19 can be rotated 360° about its axis within ring 40. This feature allows the user to position the compressor outlet 44 in any desired angular relationship with respect to the turbine inlet 46. Ring 40 also serves to position the turbocharger control actuator 50 which together with linkage 38 operates a bypass or wastegate valve (shown in FIG. 9) to control the bypass of exhaust gases around the turbine wheel. The ring 40 provides compressor pressure to the actuator 50 which controls the opening and closing of the bypass valve through linkage 38. With the bypass flow path closed, all of the engine exhaust gases are circulated through the turbine 24 in driving communication with the turbine wheel whereby the turbocharger is capable of developing substantial charge air boost pressure. However, when the bypass flow path is opened, a portion of the engine exhaust gases bypass the turbine wheel whereby the ability of the turbocharger to develop substantial charge air is decreased or limited.

Figure 4:
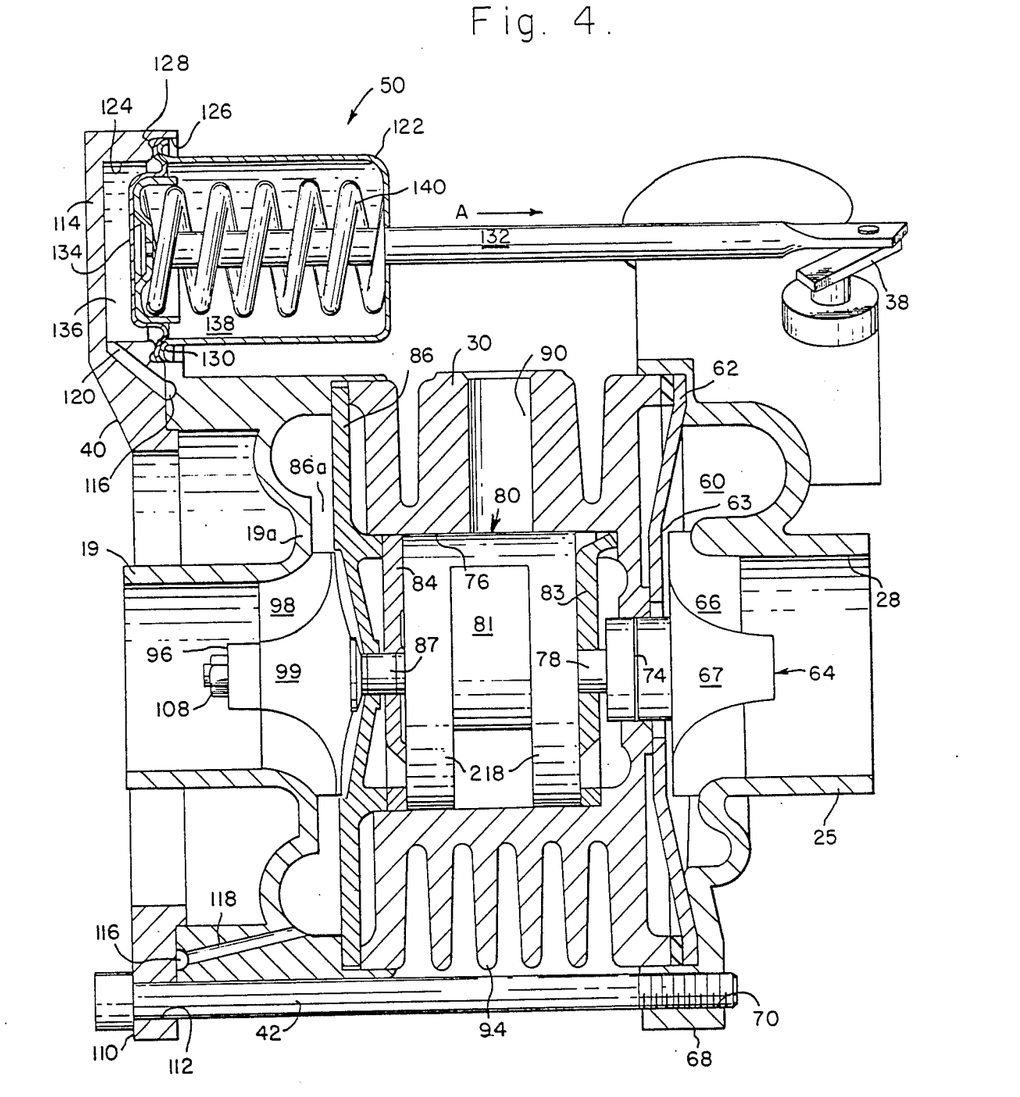
FIG. 4 is a cross-sectional view of the turbocharger taken along line 4—4 of FIG. 2.

More details of construction of the turbocharger 20 of the present invention are provided in FIGS. 2-4. In FIG. 2, for example, the compressor end view, there is illustrated the circumferential ring 40 together with the heads of bolts 42. Also illustrated is the compressor inlet 22 and compressor discharge 44. The turbine end of the turbocharger, as shown in FIG. 3, illustrates the opposite ends of the bolts 42 as screwed in or otherwise attached to the turbine housing 25. The turbine inlet 46 and turbine exhaust 28 are also shown as is the wastegate valve 36 controlled by linkage 38 from actuator 50. The exhaust passage 48 for the bypassed exhaust gases from the turbine is also shown. It would be conventional for the turbine outlet 28 and exhaust passage 48 to be joined together into a single exhaust system for the engine.

As illustrated in FIG. 4, the turbine housing 25 is generally of a cast or stamped open volute construction with the open side of the volute 60 closed by as disc-shaped heat shield 62. Because of the high temperatures associated with the exhaust gases from the internal combustion engine, both the turbine housing 25 and heat shield 62 must be fabricated from a high temperature material such as steel. During operation of the turbocharger, the heat shield 62 is exposed to exhaust gas temperatures which cause slight expansion and deflection of the heat shield 62. This expansion can cause what is known as "oil-canning" of the shield; i.e. popping out or deflection of the unsupported portion of the heat shield in the direction of least pressure. In order to reduce the deflection of the unsupported portion of the shield, the shield has been formed with a slight bend or crimp 63 therein. This bend 63 is directed toward the center housing 30 and away from the turbine wheel 64 in order to bias any "oil-canning" of the heat shield 62 in this direction. Additionally, the likelihood and magnitude of this deflection is reduced by the very nature of the turbine volute section since the area of contact between the turbine housing 25 and perimeter of the heat shield 62 increases circumferentially around the volute. Disposed to rotate within the turbine housing 25 and receive exhaust gases from the volute 60 is a turbine wheel 64 having blades 66 disposed a hub 67. Disposed at raised positions around the outer periphery of the turbine housing 25 are a plurality of outwardly extending bosses 68, each boss 68 having a threaded opening 70.

More particularly, the open volute construction contemplates, as shown, an annular, semi-circularly curved section whose maximum cross-sectional area in a plane perpendicular to the rotational axis of the turbine wheel 64. As depicted by comparing the upper and lower portions of the shown volute section, the maximum cross-sectional area smoothly varies in a circumferential direction. Importantly, one entire side of the volute section is completely open substantially at the points of maximum cross-sectional area at substantially all circumferential locations, i.e., as a fully open, semi-circular construction, greatly facilitating clean-up of the interior volute walls of the cast or stamped turbine housing.

The outer periphery of heat shield 62 is held against the open side of the volute 60 by the outer periphery of the closed or turbine end of the generally cup-shaped center housing 30. This center housing 30 may be of a die cast construction and be fabricated from a material such as aluminum. The closed or turbine end of center housing 30 includes an opening through which the hub 67 of the turbine wheel extends. Around this opening is disposed an axially projecting boss extending towards the turbine wheel which serves to position the radially inner periphery of the heat shield 62 behind the turbine wheel 64. A seal in the form of piston ring 74 is provided between the opening in the closed end of the center housing and a turbine hub 67 so as to prevent the passage of exhaust gases into the center housing, or the passage of lubricating oil from the interior of the cup-shaped center housing into the turbine housing.

The compressor end of center housing 30 is the open end of the generally cup-shaped interior thereof, presenting a cylindrical, smooth cylinder wall 76. A plurality of radially extending fins 94 are provided around the outer periphery of center housing 30 about the central axis of the turbocharger so that regardless of physical orientation, convection air will readily cool the center housing.

Like the turbine 24, the compressor housing 19 is also of a generally open volute configuration as described in greater detail with respect to the turbine housing. Since, however, it is operating in a relatively low temperature environment, it can be of a material such as die cast aluminum. The compressor, which may also be of aluminum, includes a compressor impeller 96 having blades 98 and a hub 99, and is rotatably disposed within the compressor housing 19. The shaft 78 which is affixed to the hub 67 of the turbine impeller 64, extends through the generally cup-shaped central opening in the center housing, as well as through the compressor hub 99 in an opening therein. The compressor wheel 96 is affixed to shaft 78 by means of a threaded nut 108.

Figure 5:
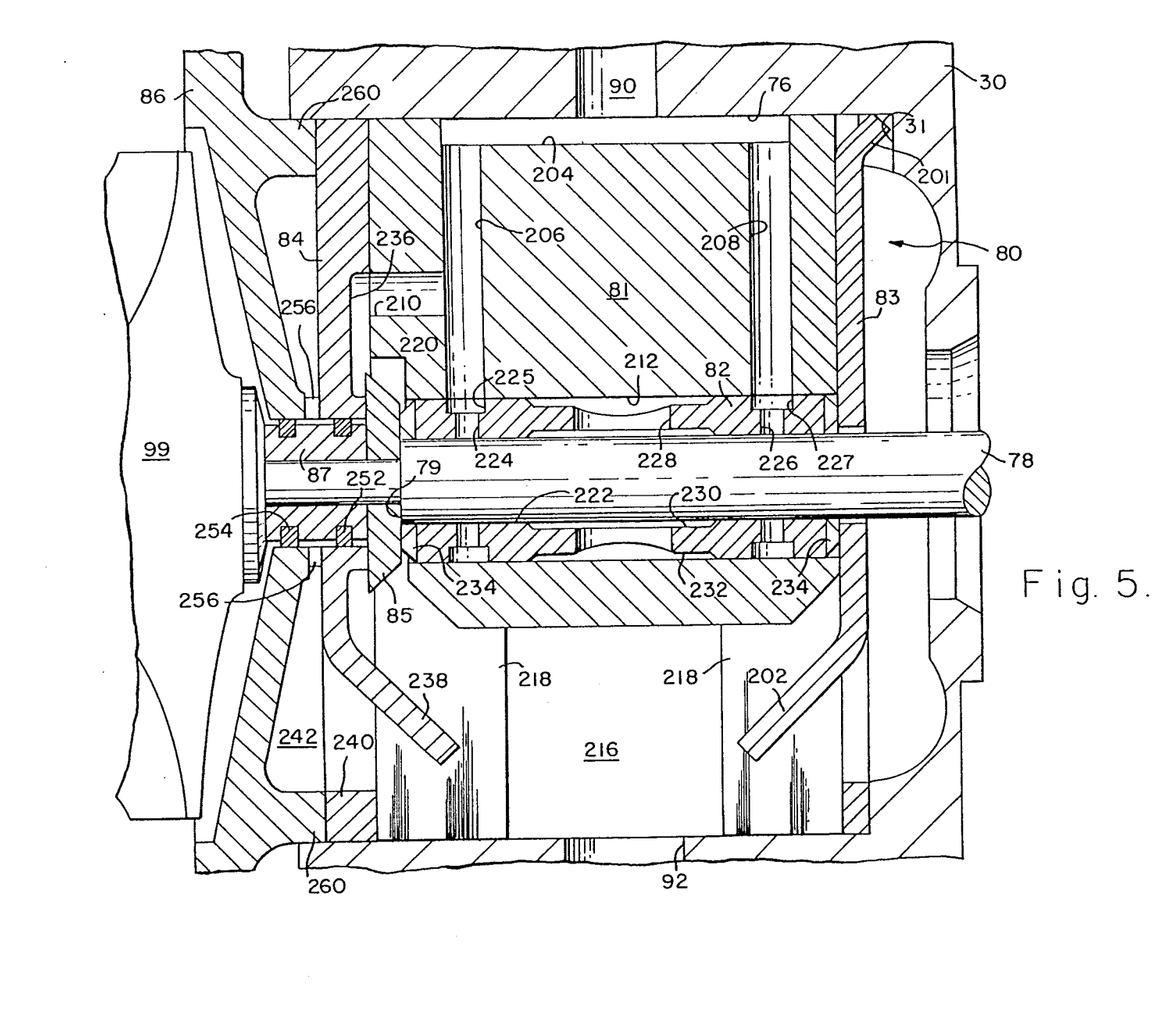
FIG. 5 is an enlarged cross-section view of the central bearing area.

Referring to FIGS. 4 and 5, disposed within the interior cylindrical wall 76 of the center housing 30 is a bearing assembly generally denoted by the numeral 80. Bearing assembly 80 includes a bearing carrier 81 of cast iron based metal or other relatively hard material in comparison to the aluminum center housing; journal bearing of aluminum or other soft material of a general sleeve configuration 82; a thrust bearing plate 83 of relatively soft material at the turbine end of the housing; a thrust bearing 84 of relatively hard material disposed generally towards the compressor end; a thrust washer 85 of hard material affixed to the shaft and disposed between thrust bearing 84 and journal bearing sleeve 82; a diffuser thrust plate 86 disposed between compressor impeller 96 and thrust bearing 84; and a thrust spacer 87 located immediately adjacent shaft 78 and extending axially from compressor impeller hub 99 to thrust washer 85.

It will be noted that diffuser thrust plate 86 serves to close the open end of the compressor volute in a manner similar to heat shield 62. Further, as shown in FIG. 4, the outer flat, annular section of diffuser/thrust plate 86 closing the volute also extends radially inwardly parallel to a diffuser section 19-a of the compressor housing to define therewith a radial diffuser space 86-a communicating the outlet of the compressor wheel with the volute portion of the compressor housing.

Diffuser thrust plate 86 is carried by and secured to compressor housing 19 at the outer periphery of the diffuser thrust plate 86. Thrust washer 85 and thrust spacer 87 are carried for rotation with shaft 78 by virtue of the compression force exerted upon tightening of threaded nut 108 which forces thrust spacer 87 and thrust washer 85 rigidly against the stepped shoulder 79 of the shaft 78. Thrust bearing 84, bearing carrier 81 and turbine end bearing plate 83 are all generally cylindrical in configuration, slipping readily within cylindrical wall 76 to which they snugly fit to be guided therein, and are each constrained against rotation within cylindrical wall 76 as described in greater detail below. In contrast, journal bearing sleeve 82 is of the full floating type, not being constrained against rotation.

Referring now more particularly to FIG. 5, turbine end bearing plate 83 is of generally circular configuration having a central opening through which the shaft 78 readily extends. Bearing plate 83 acts to deter oil migration towards the turbine; however, plate 83 also includes a stamped and bent lower leg like portion 202 serving as a oil deflector for directing lubricating oil back toward the centrally located drain outlet 92. Additionally, turbine end bearing plate 83 operates in combination with floating journal bearing 82 for providing a thrust bearing action as will be described in greater detail below. Plate 83 includes an outwardly bent tab 201 received within a mating notch 31 in center housing 30 to secure plate 83 against rotation relative to the center housing.

Bearing carrier 81 is of a generally circular shape slipping readily within cylindrical wall 76 as noted previously, and includes an axially extending groove 204 and a pair of radial bores 206 and 208 for feeding lubricating oil from inlet 90 to journal bearing 82. Additionally, bearing carrier 81 includes an axial bore 210 for feeding lubricating oil to the thrust bearing as described in greater detail below. The cast iron bearing carrier 81 has a central through bore 212 for receiving journal bearing 82. Bores 206 and 208 open perpendicularly onto bore 212 to provide relatively large openings thereon. It is important to note that central bore 212 is smooth, characterized by the absence of grooving for stabilizing the shaft. Instead, the large openings 206 and 208 provide pressure loading of bearing 82 to minimize shaft motion; yet because bores 206 and 208 are perpendicular to bore 212, there is minimal end leakage of lubricating oil through bore 212 in comparison to prior art arrangements wherein the lubricating feed bores are angled relative to the central shaft. Such prior art arrangements suffered either from excessive end leakage because of the resulting elliptically elongated opening of the oil feed bores, or required grooving on the bore 212 to promote pressure loading to minimize shaft motion while permitting smaller oil feed bores.

Figure 6:
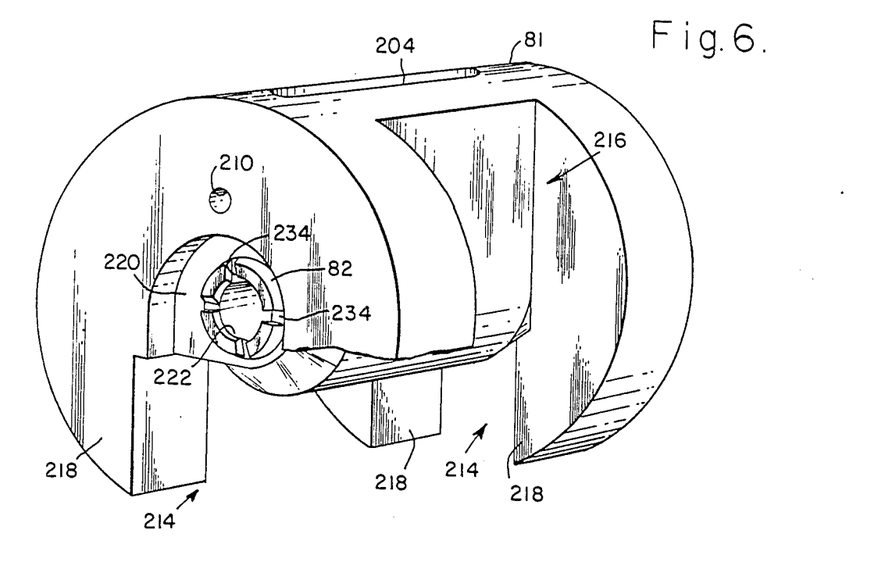
FIG. 6 is a perspective end view of the bearing carrier and journal bearing.

As best shown in FIG. 6, bearing carrier 81 has a relatively large, axially extending opening 214, as well as a similar transverse opening 216 for both weight reduction and for presenting a reservoir for the drain of lubricating oil. As a result, the lower portion of bearing carrier 81 forms four generally downwardly extending leg-like portions 218. Bearing carrier 81 further includes a relief 220 at the compressor bearing end thereof for facilitating lubricating oil drainage. Opening 214 at the compressor end snugly receives bent oil deflector portion 202 of plate 83 to thereby constrain bearing carrier 81 against rotation relative to plate 83 and compressor housing 30.

As noted, journal bearing 82 is of the full floating type and is of a general sleeve configuration with a central through bore 222 closely fitting the shaft 78. Journal bearing 82 includes a plurality of oil lubricating bores 224 and 226 generally aligned with similar passages 206 and 208 and communicating therewith through continuous peripheral grooves 225 and 227, as well as openings 228, and reliefs 230 and 232 for forming alternating lands and grooves. The lands, of course, present the primary journal bearing surfaces for the rotating shaft 78. The various lands and grooves on the general bearing 82 are relatively configured and arranged so as to produce a hydrodynamic fluid film bearing for supporting and journaling the axial shaft 78.

It is important to note that both ends of journal bearing 82 have oil feed cross grooves 234 therein for facilitating support against thrust end loads in the turbocharger. Thus, the turbine end of journal bearing 82 acts in conjunction with bearing plate 83 to present an oil film thrust bearing therebetween for assisting in supporting thrust loads in a direction towards the turbine, since bearing 82 is carried to rotate with the shaft, but at a slower speed, and thus rotates relative to stationary plate 83. Thus, as noted previously the turbine end bearing plate 83 also operates in conjunction with the full floating bearing 82 to present an end load thrust bearing.

Figure 7:
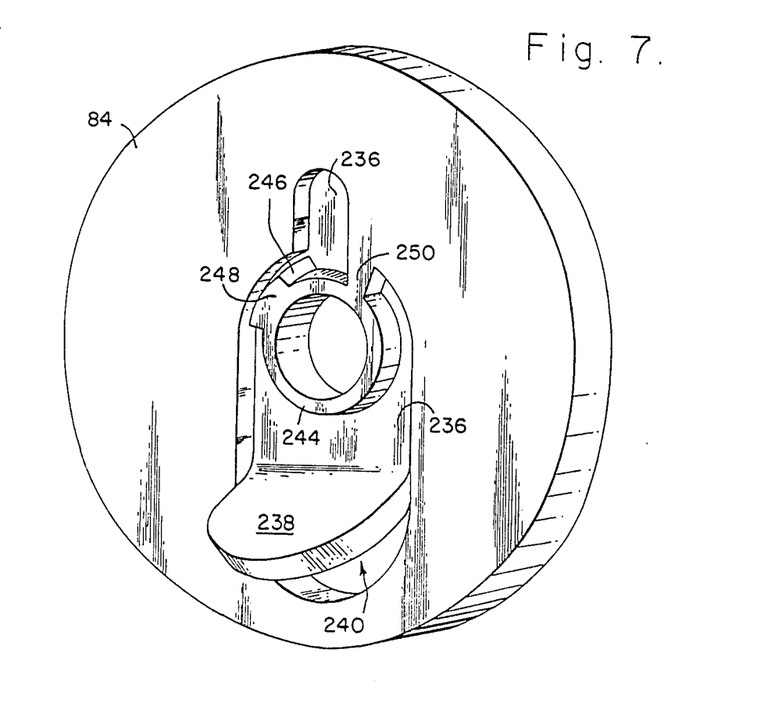
FIG. 7 is a perspective view of the center portion of the face of the thrust bearing plate facing the bearing carrier.

Referring to FIGS. 5 and 7, thrust bearing 84 includes a relief 236 on the face thereof mating with bearing carrier 81 so as to present an opening passage for lubricating oil to pass from passage 210 through relief 236 to relief 220 in bearing carrier 81 and ultimately to the compressor end grooves 234 on general bearing 82. Toward its lower end, as illustrated in both FIG. 5 and FIG. 7, the thrust bearing 87 also includes a stamped, bent oil deflector section 238, similar to deflector 202 of end plate 83, for assisting in directing lubricating oil away from the compressor end and toward oil outlet 92. Importantly, the deflector 238 also presents an opening 240 in the thrust bearing plate 84 for permitting open fluid communication between the open space 242 between diffuser thrust plate 86 and thrust bearing 84, and the interior bore 76 such that any lubricating oil which goes into space 242 is directly communicable with oil outlet 92. Similar to oil deflector 202, deflector 238 fits within opening 214 at the compressor side to be restrained against rotation relative to bearing carrier 81, plate 83, and compressor housing 30.

As clearly illustrated in FIG. 7, the configuration of thrust bearing plate 84 further includes a relatively thin angular ring section 244 immediately adjacent the rotating thrust washer 85. A ramped depression 246 extends, in the same direction as the rotational direction of shaft 78, axially toward and joins with an extended portion 248 of the annular ring or island section 244. On the opposite side of relief 236 is another bridge 250 forming another extension of the annular island 244. Together the ramp portion 246, annular island 244, and the bridge portions 248 and 250 present a configuration for developing a hydrodynamic thrust bearing thereat based upon introduction of a fluid film from the lubricating oil. This thrust bearing operates to generate a hydrodynamic fluid film between the face of annular island 244 and the rotating thrust washer 85 so as to support the assembly against thrust loads directed towards the compressor end of the turbocharger. Bridge 250 inhibits lubricating fluid flow around the right side, as viewed in FIG. 7, of the land 244 toward opening 240, and thus promotes fluid flow along ramp 246 to the thrust bearing surfaces. Similarly, extended land or bridge 248 minimizes dumping of high volume lubricating flow around the left side of land 244.

Thrust washer 85 is of flange hardened material with one of its opposing faces adjacent the thrust bearing end of the journal bearing 82, and its other end adjacent the ring section 244 of thrust bearing 84. At the opposite side of thrust washer 85, the lubricating oil fed through grooves 234 and journal bearing 82 also act as a thrust bearing assembly since, as described, bearing 82 rotates relative to washer 85.

Thrust spacer 87 carries in grooves therein a pair of seals in the form of piston rings 252, 254 which respectively align with the central bores of thrust bearing plate 84 and diffuser thrust plate 86. Piston rings 252, 254 act to impede the flow of lubricating oil from the central bearing area to the compressor, as well as to impede airflow from the compressor section into the central bearing area.

Figure 8:
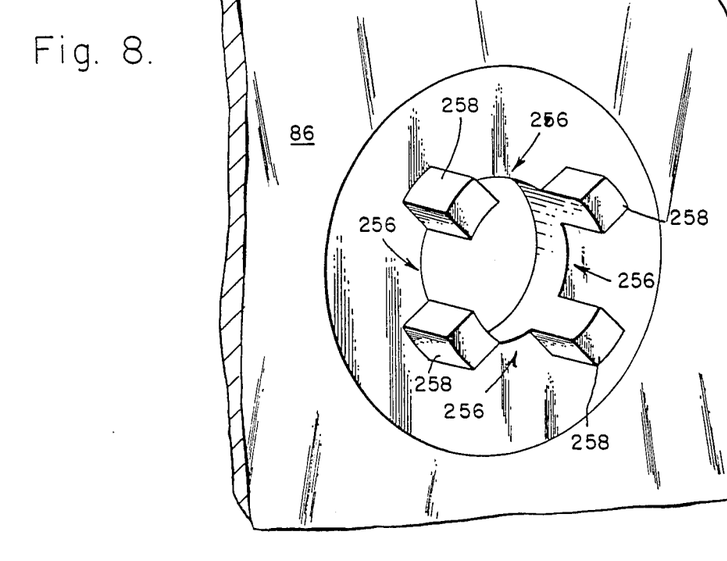
FIG. 8 is a fragmentary perspective view of the central portion of the thrust/diffuser plate.

To further facilitate separation of air and oil between the compressor and the bearing section of the turbocharger, diffuser thrust plate 86 includes a plurality of openings 256 near the central area thereof for communicating the space 242 with the space between piston seals 252 and 254. Openings 256 are best illustrated in FIG. 8. Openings 256 between spacer spokes 258 on the diffuser thrust plate 86 allow oil to drain out of the space between piston rings 252 and 254 back into space 242 and ultimately to oil outlet 92. This arrangement is particularly useful in preventing migration of lubricating oil into the compressor section. Additionally, this arrangement is also especially useful in the rare instance of pressure reversal wherein the pressure within space 242 and the central bearing area exceeds the pressure in the compressor section. In such instance the space 242 near the central area and close to openings 256 is generally an air pocket with little or no oil therein. Thus, in the instance of temporary pressure reversal, air or light oil vapor within space 242 tends to be sucked back towards and across piston ring 254 rather than oil. Accordingly, the present arrangement enhances prevention of oil migration to the compressor section even upon temporary, transient pressure reversal conditions.

Diffuser/thrust plate 86 also includes an axially extending boss 260 snugly fitted, piloted, and guided within cylinder wall 76. As noted, the outer periphery of plate 86 is clamped by compressor housing 19 to prevent rotation thereof relative to the housings and the remainder of bearing assembly 80. Yet, the entire bearing assembly 80, including plate 86, is piloted by the same cylindrical wall 76 to maintain concentricity of the assembly. But at the same time, the axial clamping, holding force for assembly 80 is provided by the several bolts 42, the clamping load being transmitted from the annular ring 40 through the compressor housing 19 through the periphery of plate 86 to its center boss 260, to bearing plate 84, bearing carrier 81, and turbine end bearing plate 83. As desired, a sealant may be included between boss 260 and cylindrical wall 76 to minimize lubrication leakage to the compressor section. The overall arrangement of bearing assembly 80 provides a compact, extremely economical bearing arrangement for the turbocharger. Each of the components performs several duties as described above, thus minimizing the number components and simplfying assembly dramatically.

Of particular note is the thrust bearing arrangement provided at opposite ends of floating, rotating journal bearing 82. At both these ends, the thrust bearing action is to support the turbocharger against thrust directed toward the turbine end. In automotive applications of such a turbocharger, wherein wastegate 36 is operable during a significant portion of the duty cycle, the thrust bearing surfaces for supporting against thrust directed toward the turbine end experience substantially greater duty, than the surfaces supporting thrust directed toward the compressor. In the present invention, the duty of supporting against this turbine-directed thrust is shared by the thrust bearings formed at the two ends of the journal bearing. Furthermore, the relative rotational speeds at both ends are less, since journal bearing 82 is freely rotating at a lower intermediate speed in comparison to shaft speed.

Referring now to FIGS. 1–4 again, the annular ring 40 is disposed around the outer end of the compressor housing 19 and includes a plurality of radially projecting bosses 110, each of which includes a opening 112. The openings 112 in this ring 40 are axially aligned with the threaded openings 70 in the turbine housing 25. The bolts 42 extend through the openings 112 and are threadably engaged with the opening 70 in the turbine housing to hold together the turbine and compressor around the center housing. Integral with the ring 40 is the actuator cover 114. A circumferential passage 116 is provided between the exterior of the compressor housing 19 and the ring 40, and this passage is exposed to the compressor volute by means of passage 118. The circumferential passage 116 is connected to the interior of the actuator cover by means of passage 120. The passages 116, 118, 120 together serve to transmit compressor pressure to the interior of the actuator cover.

The turbocharger control actuator 50 is shown in FIG. 2 for controllably moving the wastegate valve 36 (shown in FIGS. 9 and 10) in response to variations and the engine speed or load. As shown, the actuator 50 comprises a cap 122 attached to the actuator cover 114 thereby forming an actuator housing. The actuator cover 114 has a first bore 124 and a concentric enlarged bore 126 therein. The bores 124 and 126 are separated by an annular transition section 128. The transition section 128 can be further modified by either having an annular groove formed therein next to the wall defining the enlarged bore 126 or by forming a sinusoidal or S-shaped transition section as shown in FIG. 2. The cover 114 has a passage 120 therein flow connecting the first bore 124 and the circumferential passage 116.

The actuator cap 122 is generally cylindrical in shape and has an open and closed end. The edge of the open end is rolled back outwardly upon itself to form a rolled lip 130. The rolled lip of the actuator cap is pressed into the actuator cover 114 and wedges itself into the enlarged bore 126 securing the cap 122 to the cover 114. The closed end has a substantially concentric aperture therein for passage of an actuator rod 132 therethrough.

Within the actuator housing is an internal flexible diaphragm 134 dividing the housing interior into two isolated chambers; actuator pressure chamber 136 and chamber 138. The actuator rod 132 is coupled to the diaphragm 134, and extends through the chamber 138 and through the aperture in the closed end of the cap 122 for connection to the wastegate valve 36. A spring 140 within the chamber serves to bias the diaphragm 134 and the rod 132 against movement toward the wastegate valve 36. Chamber 138 is vented to the ambient air pressure. Actuator pressure chamber 136 is connected to the compressor discharge pressure via passage 120, the circumferential passage 116 and passage 118. When the pressure in the actuator pressure chamber 136 reaches a level predetermined by the mechanical characteristics of the spring 140, the diaprhagm 134 flexes against the spring to carry the actuator rod 132 in the same direction. Of course, when the pressure in the pressure drops off, the reverse action occurs.

As shown in FIG. 2, a linkage system 38 connects the actuator rod 132 to the waste gate valve 36. Movement of the actuator rod 132, which is operably connected to the spring biased diaphragm 134, serves to control the opening and closing of the waste gate valve 36 thereby allowing exhaust gases from the turbine housing gas inlet flow 46 through bleed hole 146 bypassing the turbine 24. Specifically, the waste gate valve 36 comprises a substantially flat circular-shaped valve head 144 having a diameter larger than the diameter of the bleed hole 146. The valve head 144 is secured by a rivet 148 to one end of a valve stem 150 extending rearwardly from the valve head 144 into the bypass chamber 48. A metal strip 152 is relatively loosely received over the stem 150 adjacent to valve head 144 and a washer 154 fixed on the rear end of the valve stem 150. The metal strip 152 extends generally upwardly from the valve stem 150 and is wrapped around and fixed at its upper end as by welding to one end of shaft 156. The shaft 156 extends through the side wall of the discharge housing, and has its outwardly extending end secured to one end of the crank link 38. The other end of the crank link is pivotally connected to actuator rod 132.

Figure 9:
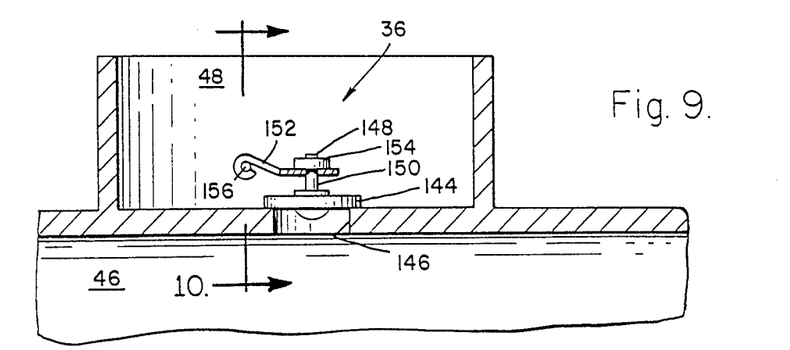
FIG. 9 is an enlarged fragmented horizontal section taken on the line 9—9 of FIG. 3.
Figure 10:
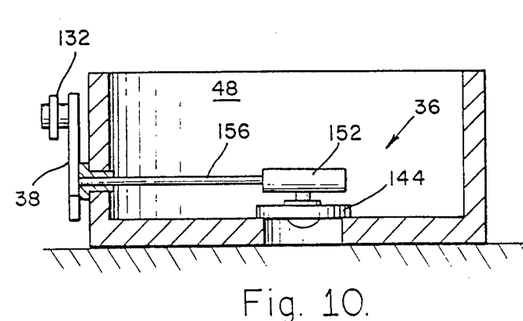
FIG. 10 is an enlarged vertical section taken along line 10—10 of FIG. 9.

As shown in FIG. 9, the actuator rod 132 is shifted in the direction of arrow A, the crank link 38 is pivoted to rotate the shaft 156 about its own axis in a direction counter clockwise as viewed in FIG. 10. Rotation of shaft 156 carries the metal strip 152 away from contact with the valve head 144, and thereby allows exhaust gases from turbine housing gas inlet 46 to blow the valve head 144 away from its seated position on the turbine housing 25 opening the bleed hole 146. In this manner, exhaust gases are allowed to bypass the turbine 24, whereby the turbine is no longer driven at maximum speed to correspondingly reduce compressor boost pressure. The volumetric flow rate of exhaust gases bypassing the turbine wheel is dependent upon the degree of opening of the waste gate valve 36 with respect to the bleed hole 146.

Various modifications to the depicted and described method and apparatus will be apparent to those skilled in the art. Accordingly, the foregoing detailed description of the preferred embodiment of the invention should be considered exemplary in nature, and not as limiting to the scope and spirit of the invention as set forth in the appended claims.

Having described the invention with sufficient clarity that those skilled in the art may practice it, I claim:

1. A turbocharger comprising:
    a turbine having a turbine wheel carried within a turbine housing and rotatably driven by exhaust gases from an internal combustion engine;
    a compressor having a compressor wheel carried within a compressor housing and rotatably driven by said turbine for supplying charge air to the internal combustion engine;
    a common shaft connected between said turbine wheel and said compressor wheel;
    a center housing connected between said turbine housing and said compressor housing around said common shaft and including bearing means to rotatably support said common shaft;
    said turbine housing having an open volute and a generally disk-shaped heat shield to close the open volute and also including a plurality of bolt openings therein; and said compressor housing having an open volute and a thrust-diffuser plate closing the open volute;
    an annular ring disposed around said compressor housing and including a plurality of bolt openings therein aligned with the bolt openings in said turbine housing; and
    a plurality of bolts extending between said turbine housing and said annular ring in the openings therein.

2. The turbocharger of claim 1 wherein said center housing is generally cup-shaped with its closed end positioning the heat shield of said turbine housing.

3. The turbocharger of claim 2, wherein said center housing includes a plurality of radially outwardly extending cooling fins.

4. The turbocharger of claim 3, wherein said cooling fins are generally symmetrically arranged about a vertical plane through said shaft.

5. The turbocharger of claim 1, wherein said compressor housing is rotatably positionable about its axis.

6. The turbocharger according to claim 1 further including an actuator housing comprising:
    an actuator cover integral with the annular ring disposed around the compressor housing, said actuator cover having at least one bore therein; and
    a generally cup shaped actuator cap having its open end secured within said at least one bore.

7. The turbocharger according to claim 6 wherein said actuator cover has a first bore and a concentric enlarged bore therein with an annular transition section therebetween.

8. The turbocharger according to claim 7 wherein said transition section has a groove therein.

9. The turbocharger according to claim 8 wherein said transition section is S-shaped.

10. The turbocharger according to claim 9 wherein said actuator cap has an outwardly rolled edge.

11. The turbocharger according to claim 1 further including a means forming a bypass flow path for bypass passage of exhaust gases around the turbine, a control actuator comprising a housing with a pressure chamber therein, said housing operably associated with the compressor, and means, internal of said compressor and said housing, for transporting a control pressure from said compressor to said actuator pressure chamber.

12. The turbocharger according to claim 1 wherein said compressor includes a compressor housing defining an inlet and an outlet.

13. The turbocharger according to claim 12 wherein said annular ring includes an integral actuator cover.

14. The turbocharger according to claim 13 further including means forming a bypass flow path for bypass passage of exhaust gases around the turbine, a control actuator having a pressure chamber therein, means for opening and closing the bypass flow path, and means for transporting a control pressure from said compressor outlet to said actuator pressure chamber.

15. The turbocharger according to claim 14 wherein said means for transporting includes a compressor housing passage internal of said compresor housing and flow connected to said compressor outlet, an annular circumferential passage formed by and internal of said compressor housing and said annular ring member flow connected to said compressor housing passage and an actuator cover passage internal of said actuator cover and flow connected to said annular passage and said actuator pressure chamber.

16. The turbocharger of claim 1 further including:
a lubricating fluid passage in said center housing;
a journal bearing sleeve disposed in said center housing in free floating arrangement relative thereto between said center housing and said shaft for rotatably supporting said shaft, said journal bearing sleeve having passages therein for receiving lubricating fluid from said lubricating fluid passage for developing a hydrodynamic fluid bearing film for rotatably supporting said shaft, said sleeve arranged to rotate at a speed slower than said shaft under the urgings of rotation of the shaft acting through said hydrodynamic fluid bearing film, said bearing sleeve having lubricating feed grooves in a transversely extending end surface thereof; and
a turbine end bearing plate operably secured to said center housing to be constrained against rotation relative thereto and located with a transverse surface closely adjacent in said end surface of said bearing sleeve, said lubricating feed grooves configured and arranged to develop a hydrodynamic fluid film between said end surface of the bearing sleeve and said transverse surface of the turbine end bearing plate for providing support for axial thrust loads imposed upon said bearing sleeve in a direction toward said plate.

17. A turbocharger as set forth in claim 16, further including a thrust washer of larger diameter than said shaft secured for rotation with said shaft, said thrust washer located closely adjacent an opposite transversely extending end surface of said bearing sleeve, said opposite end surface of the bearing sleeve also having lubricating feed grooves therein for developing a hydrodynamic fluid film between said washer and said opposite end surface for also providing support for axial thrust loads in said direction.

18. A turbocharger as set forth in claim 17, wherein said shaft has a stepped diameter presenting a transverse shoulder engaged by said thrust washer.

19. A turbocharger as set forth in claim 16, wherein said turbine end bearing plate is disposed between said turbine and said bearing sleeve for supporting thrust loads directed toward said turbine.

20. A turbocharger as set forth in claim 19, further including a thrust washer of larger diameter than said shaft secured for rotation with said shaft, said thrust washer located closely adjacent an opposite transversely extending end surface of said bearing sleeve, said opposite end surface of the bearing sleeve also having lubricating feed grooves therein for developing a hydrodynamic fluid film between said washer and said opposite end surface for also providing support for axial thrust loads directed toward said turbine.

21. A turbocharger as set forth in claim 20, further including a thrust spacer sleeve surrounding said shaft, and extending between said compressor and said thrust washer and securely clamped therebetween for causing said thrust spacer sleeve to rotate with said shaft and for transmitting axial thrust loads from said compressor through said spacer sleeve to said thrust washer.

22. A turbocharger as set forth in claim 21, further including a thrust plate operably secured against rotation relative to said housing and located between said compressor and said thrust washer, said thrust plate configured to develop a hydrodynamic fluid film between said thrust plate and a face of said thrust washer opposite the face thereof adjacent said bearing sleeve for providing support for axial thrust loads imposed on said thrust washer in an opposite direction toward said compressor.

23. A turbocharger as set forth in claim 22, wherein said thrust plate has a depression therein for directing lubricating flow from said lubricating fluid passage in the center housing to both of said faces of said thrust washer.

24. A turbocharger as set forth in claim 23, wherein said turbocharger includes wastegate valve means for controlling motive fluid flow to rotate said turbine, whereby the thrust load on said turbocharger directed toward said aturbine is greater than the opposite thrust load in the overall duty cycle of said turbocharger.

25. A turbocharger comprising:
a turbine wheel rotatably driven by exhaust gases from an internal combustion engine;
a compressor wheel mounted on a shaft common with said turbine wheel and rotatably driven thereby;
a turbine housing disposed around said turbine wheel to direct the exhaust gases through said turbine wheel, said turbine housing including a plurality of bolt openings therein;
a compressor housing disposed around said compressor wheel to direct ambient air through said wheel whereby said air is compressed for supplying to the internal combustion engine;
a center housing disposed between said turbine housing and said compressor housing and including bearing means to rotatably support the shaft common to said turbine wheel and said compressor wheel;

an annular ring disposed around said compressor housing and including a plurality of bolt openings therein aligned with the bolt openings in said turbine housing; and a plurality of bolts extending between said annular ring and said turbine housing in the openings therein.

26. The turbocharger of claim 25, wherein said turbine housing is an open volute closed with a heat shield.

27. The turbocharger of claim 25, wherein said center housing includes a plurality of radially outwardly extending cooling fins.

28. The turbocharger of claim 25, wherein said compressor housing includes an open volute closed with a thrust-diffuser plate.

29. The turbocharger of claim 28, wherein said bolts are operable to intersecure said compressor and turbine housings and to rigidly clamp said center housing therebetween, said thrust-diffuser plate arranged with a peripheral section thereof retained by said compressor housing, said thrust-diffuser plate having a central boss contacting said bearing means whereby the bearing means are held within said center housing by the clamping force of said bolts as transmitted through said central boss.

30. The turbocharger of claim 29, wherein said compressor housing includes a radial, transversely flat diffuser section, said thrust-diffuser plate having an outer, flat, annular section closing said open volute and extending radially inwardly sufficiently to define a radial diffuser space between said thrust-diffuser plate and said compressor housing.

31. The turbocharger of claim 30, wherein said thrust-diffuser plate includes a flat, disk-shaped section extending radially inwardly from said flat outer section at an angle relative thereto in backing relationship to said compressor wheel.

32. The turbocharger of claim 28, wherein said open volute of the compressor housing comprises an annular, semi-circularly curved section whose maximum cross-sectional area smoothly varies circumferentially, said open volute having an open side located substantially at the point of said maximum cross-sectional area at substantially all circumferential locations of said volute.

33. The turbocharger of claim 29, wherein said peripheral section of the thrust-diffuser plate is clamped between said compressor housing and said center housing, with the remainder of said thrust-diffuser plate located inside said compressor housing and center housing.

34. The turbocharger of claim 26, wherein the heat shield has an annular bend therein.

35. The turbocharger according to claim 25, further including an actuator housing comprising:

an actuator cover integral with the annular ring disposed around the compressor housing, said actuator cover having at least one bore therein; and a generally cup shaped actuator cap having its open end secured within said at least one bore.

36. The turbocharger according to claim 35 wherein said actuator cover has a first bore and a concentric enlarged bore therein with an annular transition section therebetween.

37. The turbocharge according to claim 36 wherein said transition section has a groove therein.

38. The turbocharger according to claim 37 wherein said transition section is S-shaped.

39. The turbocharger according to claim 38 wherein said actuator cap has an outwardly rolled edge.

40. The turbocharger according to claim 25 further including a means forming a bypass flow path for bypass passage of exhaust gases around the turbine wheel, a control actuator comprising a housing with a pressure chamber therein, said housing operably associated with the compressor, and means, internal of said compressor and said housing, for transporting a control pressure from said compressor to said actuator pressure chamber.

41. The turbocharger according to claim 25 wherein said compressor housing includes an inlet and an outlet.

42. The turbocharger according to claim 41 wherein said annular ring includes an integral actuator cover.

43. The turbocharger according to claim 42 further including means forming a bypass flow path for bypass passage of exhaust gases around the turbine wheel, a control actuator having a pressure chamber therein, means for opening and closing the bypass flow path, and means for transporting a control pressure from said compressor outlet to said actuator pressure chamber.

44. The turbocharger according to claim 43 wherein said means for transporting includes a compressor housing passage internal of said compressor housing and flow connected to said compressor outlet, an annular circumferential passage formed by and internal of said compressor housing and said annular ring member flow connected to said compressor housing passage and an actuator cover passage internal of said actuator cover and flow connected to said annular passage and said actuator pressure chamber.

45. Apparatus for delivering compressed airflow to the intake manifold of an internal combustion engine comprising:

a housing arrangement having a compressor volute open at one side, a bearing cavity, a portion of said bearing cavity defining a reservoir for lubricating fluid, and lubricating fluid inlet and outlet passages communicating with said bearing cavity;

a compressor rotatably carried in said housing arrangement for compressing airflow to be delivered to said engine;

a shaft operably connected to drive said compressor and extending into said bearing cavity;

bearing means in said cavity for rotatably supporting said shaft and for providing support for axial thrust loads developed by said apparatus, said bearing means including a thrust plate operably secured to said housing arrangement;

a diffuser plate operably secured to said housing and disposed between said thrust plate and said compressor for closing said open side of the compressor volute, said diffuser plate and thrust plate relatively positioned to define an open space therebetween, both said diffuser and thrust plates having central openings therein through which said shaft extends, said thrust plate having an opening therein communicating said open space with said reservoir; and a pair of sealing members disposed between said shaft and said central openings in said thrust and diffuser plates respectively, said sealing members defining an annularly shaped, axially extending space therebetween communicating with said open space between said thrust and diffuser plates, said diffuser plate having axially extending spacer spokes adjacent said central opening therein for contacting said diffuser plate to relatively position said thrust and diffuser plates, said spacer spokes defining radial openings therebetween communicating said annularly shaped, axially extending space with said open space between said thrust and diffuser plates.

46. Apparatus as set forth in claim 45, further including a spacer collar extending through said central openings in said thrust and diffuser plates, said collar carrying said pair of sealing members and arranged to rotate with said shaft.

47. Apparatus as set forth in claim 46, wherein said pair of sealing members are piston rings disposed in grooves in said spacer collar and respectively rotating against said central openings in said thrust and diffuser plates in sealing engagement therewith.

48. Apparatus as set forth in claim 45, said thrust plate having an oil deflector section thereof extending into said reservoir for directing lubricating fluid flow expelled from said bearing means toward said fluid outlet passage.

49. Apparatus as set forth in claim 48, wherein said oil deflector section comprises an integral bent tang of said thrust plate extending at an angle from the major planes of said thrust plate to define said opening in the thrust plate communicating said reservoir with said open space between said thrust and diffuser plates.

50. The apparatus of claim 45 wherein said bearing means comprises:
- a journal bearing sleeve disposed in said housing in free floating arrangement relative thereto between said housing and said shaft for rotatably supporting said shaft, said journal bearing sleeve having passages therein for receiving lubricating fluid from said lubricating fluid passage for developing a hydrodynamic fluid bearing film for rotatably supporting said shaft, said sleeve arranged to rotate at a speed slower than said shaft under the urgings of rotation of the shaft acting through said hydrodynamic fluid bearing film, said bearing sleeve having lubricating feed grooves in a transversely extending end surface thereof; and
- a turbine end bearing plate operably secured to said housing to be constrained against rotation relative thereto and located with a transverse surface closely adjacent in said end surface of said bearing sleeve, said lubricating feed grooves configured and arranged to develop a hydrodynamic fluid film between said end surface of the bearing sleeve and said transverse surface of the turbine end bearing plate for providing support for axial thrust loads imposed upon said bearing sleeve in a direction toward said plate.

51. An apparatus as set forth in claim 50, further including a thrust washer of larger diameter than said shaft secured for rotation with said shaft, said thrust washer located closely adjacent an opposite transversely extending end surface of said bearing sleeve, said opposite end surface of the bearing sleeve also having lubricating feed surface of the bearing sleeve also having lubricating feed grooves therein for developing a hydrodynamic fluid film between said washer and said opposite end surface for also providing support for axial thrust loads in said direction.

52. An apparatus as set forth in claim 51, wherein said shaft has a stepped diameter presenting a transverse shoulder engaged by said thrust washer.

53. An apparatus as set forth in claim 50, wherein said turbine end bearing is disposed between said turbine and said bearing sleeve for supporting thrust loads directed toward said turbine.

54. An apparatus as set forth in claim 53, further including a thrust washer of larger diameter than said shaft secured for rotation with said shaft, said thrust washer located closely adjacent an opposite transversely extending end surface of said bearing sleeve, said opposite end surface of the bearing sleeve also having lubricating feed grooves therein for developing a hydrodynamic fluid film between said washer and said opposite end surface for also providing support for axial thrust loads directed toward said turbine.

55. An apparatus as set forth in claim 54, further including a thrust spacer sleeve surrounding said shaft, and extending between said compressor and said thrust washer and securely clamped therebetween for causing said thrust spacer sleeve to rotate with said shaft and for transmitting axial thrust loads from said compressor through said spacer sleeve to said thrust washer.

56. The apparatus of claim 55 further including a thrust plate operably secured against rotation relative to said housing and located between said compressor and said thrust washer, said thrust plate configured to develop a hydrodynamic fluid film between said thrust plate and a face of said thrust washer opposite the face thereof adjacent said bearing sleeve for providing support for axial thrust loads imposed on said thrust washer in an opposite direction toward said compressor.

57. An apparatus as set forth in claim 56, wherein said thrust plate has a depression therein for directing lubricating flow from said lubricating flow passage in the housing to both of said faces of said thrust washer.

58. A turbocharger as set forth in claim 57, wherein said turbocharger includes wastegate valve means for controlling motive fluid flow to rotate-said turbine, whereby the thrust load on said turbocharger directed toward said turbine is greater than the opposite thrust load in the overall duty cycle of said turbocharger.

59. Apparatus for delivering compressed, pressurized airflow to an internal combustion engine, comprising:
- a front compressor housing having a volute with an open side;
- a rear housing having a plurality of bolt holes therein;
- an annular ring disposed around said compressor housing and having a plurality of bolt openings therein aligned with said bolt holes in the rear housing;
- a center housing disposed between said compressor housing and said rear housing;
- a compressor wheel rotatably carried in said compressor housing for compressing air flow to be delivered to the engine;
- a shaft drivingly engaging said compressor wheel and extending into said center housing;
- bearing means disposed in said center housing for rotatably supporting said shaft to said center housing;
- a thrust-diffuser plate having a peripheral section retained by said compressor housing, a radially extending section closing said open side of the volute, and a central boss contacting said bearing means; and
- a plurality of bolts extending between said annular ring and said rear housing for axially clamping said annular ring, compressor housing, central housing, and rear housing, and for axially clamping said bearing means within said center housing through said central boss.

60. A method of supporting a rotating shaft of a turbocharger, said shaft operably interconnecting a compressor with an exhaust gas driven turbine, said turbocharger having a housing at least a portion of which is of aluminum based material, said method comprising the steps of:
developing a hydrodynamic fluid flow between the shaft and an aluminum-based bearing sleeve for journalling the shaft within the aluminum sleeve;
supporting the bearing sleeve to the aluminum-based housing portion through an intermediate bearing carrier of material substantially harder than the bearing sleeve and housing portion, the bearing carrier being operably secured against rotation relative to the housing;
permitting the bearing sleeve to rotate relative to the shaft and the bearing carrier;
generating a hydrodynamic fluid film between one end of the rotating bearing sleeve and a thrust plate operably secured to the housing to support the shaft against axial loads in one direction;
generating another hydrodynamic fluid film between the opposite end of the bearing sleeve and a thrust washer operably secured to rotate with the shaft to assist in supporting the shaft against the axial loads in said one direction; and
generating an opposing hydrodynamic fluid film between the thrust washer rotating with the shaft and a second thrust plate operably secured to the housing, for supporting the shaft against axial loads in a direction opposite said one direction.

61. A method as set forth in claim 60, further including the steps of: interengaging the first-mentioned thrust plate and the housing to prevent relative rotation therebetween, interengaging the bearing carrier and the first-mentioned thrust plate; and interengaging the second thrust plate and the bearing carrier.

* * * * *